United States Patent
Cheon (10) Patent No.: US 10,808,978 B2
(45) Date of Patent: *Oct. 20, 2020

(54) SYSTEM AND METHOD OF CONTROLLING ICE MAKER

(71) Applicant: DAEYEONG E&B Co., Ltd., Ansan-si, Gyeonggi-do (KR)

(72) Inventor: Jae Yun Cheon, Bucheon-si (KR)

(73) Assignee: DAEYEONG E&B CO., LTD., Ansan-si, Gyeonggi-Do (KR)

( * ) Notice: Subject to any disclaimer, the term of this patent is extended or adjusted under 35 U.S.C. 154(b) by 230 days.

This patent is subject to a terminal disclaimer.

(21) Appl. No.: 15/972,355

(22) Filed: May 7, 2018

(65) Prior Publication Data
US 2019/0178553 A1   Jun. 13, 2019

(30) Foreign Application Priority Data
Dec. 8, 2017   (KR) .................. 10-2017-0168173

(51) Int. Cl.
*F25C 5/187* (2018.01)
*G05D 9/12* (2006.01)
(Continued)

(52) U.S. Cl.
CPC .............. *F25C 5/187* (2013.01); *F25C 1/25* (2018.01); *G05D 9/12* (2013.01); *F25C 1/12* (2013.01);
(Continued)

(58) Field of Classification Search
CPC ........ F25C 5/187; F25C 1/25; F25C 2700/02; F25C 2700/04; F25C 2600/04;
(Continued)

(56) References Cited

U.S. PATENT DOCUMENTS 4,774,814 A * 10/1988 Yingst .................. F25C 1/12
                                                        62/126
5,477,694 A    12/1995 Black et al.
(Continued)

FOREIGN PATENT DOCUMENTS

JP    S59-173671 A    10/1984
JP    H11-051527 A    2/1999
(Continued)

OTHER PUBLICATIONS

Notice of Allowance dated Oct. 30, 2019 from Corresponding U.S. Appl. No. 15/972,367, 14 pgs.
(Continued)

*Primary Examiner* — Kun Kai Ma
(74) *Attorney, Agent, or Firm* — Brinks Gilson & Lione (57) ABSTRACT

Disclosed is a system of controlling an ice maker. The system includes: an ice making part producing ice; an ice reservoir storing the ice; a water reservoir storing water supplied from outside and providing the water to the ice making part or draining the water; and a controller, when a full state of the ice reservoir is sensed after an ice separation process of separating the ice produced in the ice making part is completed, stopping operation of the ice making part and allowing a first drainage of the water stored in the water reservoir to a predetermined water level and a second drainage of the stored water for a predetermined additional drainage time. In particular, the controller controls the additional drainage time desired for the second drainage by comparing an actual drainage time desired for the first drainage with a preset normal time.

18 Claims, 5 Drawing Sheets

(51) Int. Cl.
*F25C 1/25* (2018.01)
*G01F 23/00* (2006.01)
*F25C 1/12* (2006.01)

(52) U.S. Cl.
CPC ...... *F25C 2600/04* (2013.01); *F25C 2700/02* (2013.01); *F25C 2700/04* (2013.01); *G01F 23/0092* (2013.01)

(58) Field of Classification Search
CPC .............. F25C 2400/14; F25C 2400/12; F25C 2305/022; F25C 5/04; F25C 2600/02
See application file for complete search history.

(56) References Cited

U.S. PATENT DOCUMENTS

| 2001/0039804 | A1* | 11/2001 | Newman | F25C 5/10 62/66 |
| 2004/0194480 | A1 | 10/2004 | Kim et al. | |
| 2007/0089451 | A1* | 4/2007 | Lee | F25C 5/10 62/352 |
| 2008/0072610 | A1* | 3/2008 | Venkatakrishnan | F25C 5/08 62/135 |
| 2010/0101244 | A1* | 4/2010 | Yoshida | F25C 1/25 62/66 |
| 2011/0036115 | A1* | 2/2011 | Lee | F25C 1/08 62/344 |
| 2016/0054043 | A1* | 2/2016 | Broadbent | F25C 1/25 62/66 |
| 2016/0298893 | A1* | 10/2016 | Knatt | F25C 1/12 |
| 2016/0327352 | A1* | 11/2016 | Broadbent | F25B 39/00 |
| 2017/0016662 | A1* | 1/2017 | Noh | F25C 1/08 |
| 2019/0178550 | A1* | 6/2019 | Cheon | F25C 1/04 |
| 2019/0178551 | A1* | 6/2019 | Cheon | F25C 1/25 |
| 2019/0178553 | A1* | 6/2019 | Cheon | G05D 9/12 |

FOREIGN PATENT DOCUMENTS

| JP | 2001-336865 A | 12/2001 |
| JP | 2002-206827 A | 7/2002 |
| JP | 2005-114224 A | 4/2005 |
| JP | 5097459 B2 | 12/2012 |
| JP | 2015-087050 A | 5/2015 |
| KR | 10-2003-0015056 A | 2/2003 |
| KR | 10-2005-0083744 A | 8/2005 |
| KR | 10-2006-0125456 | 12/2006 |
| KR | 20-2009-0005849 U | 6/2009 |
| KR | 10-2014-0045325 A | 4/2014 |
| KR | 10-2015-0115988 A | 10/2015 |
| WO | 2012-106318 A1 | 8/2012 |

OTHER PUBLICATIONS

Korean Notice of Allowance dated Sep. 26, 2019 from the corresponding Korean Application No. 10-2017-0168173, 5 pp.
Korean Office Action dated Oct. 30, 2019 from the corresponding Korean Application No. 10-2017-0168175, 8 pp.
Office Action dated Jul. 28, 2020 from Corresponding Korean Application No. 10-2017-0168174, 2 pp.

* cited by examiner

SYSTEM AND METHOD OF CONTROLLING ICE MAKER

CROSS REFERENCE TO RELATED APPLICATION

This application claims priority to and the benefit of Korean Patent Application No. 10-2017-0168173, filed on Dec. 8, 2017, which is incorporated by reference in its entirety.

FIELD

The present disclosure relates to a system and method of controlling an ice maker.

BACKGROUND

The statements in this section merely provide background information related to the present disclosure and may not constitute prior art.

In general, an ice maker is configured such that water supplied from a water reservoir through a pump is cooled by an evaporator to produce ice in an ice making part, and then the produced ice is separated and falls down from the ice making part.

More specifically, the ice maker repeatedly performs ice making and separation processes, in which water supplied from the water reservoir to the ice making part is cooled to produce ice, and then the produced ice is stored in an ice reservoir, and so on.

Meanwhile, ice produced through the above-described processes is stored in the ice reservoir. In the case that the ice reservoir is in a full state due to repetitive processes, operation of the ice maker is stopped because there is no space for storing additionally produced ice. We have discovered that when a user does not use ice stored in the ice reservoir and thus the ice reservoir is maintained in the full state, water stored in the water reservoir may stagnate because the ice maker does not operate, leading to contamination of water stored in the water reservoir. Thus, in order to avoid contamination of water stored in the water reservoir, we desire to develop a technique capable of efficiently draining water in the water reservoir according to conditions.

The foregoing is intended merely to aid in the understanding of the background of the present disclosure, and is not intended to mean that the present disclosure falls within the purview of the related art that is already known to those skilled in the art.

SUMMARY

In one form of the present disclosure, a system and a method of controlling an ice maker is disclosed. In the exemplary form, when a full state of an ice reservoir is sensed after an ice separation process of separating ice produced in the ice making part is completed, operation of the ice making part is stopped, and water stored in a water reservoir is drained firstly to a predetermined water level and drained secondarily for a predetermined additional drainage time. In particular, an actual drainage time desired for the first drainage is compared with a preset normal time and the additional drainage time desired for the second drainage is controlled, such that water stored in the water reservoir is efficiently drained. Thus, contamination of water stored in the water reservoir is inhibited or prevented and thus ice is produced in a sanitary manner.

According to one aspect of the present disclosure, a system of controlling an ice maker may include: an ice making part producing ice; an ice reservoir storing the produced ice in the ice making part; a water reservoir provided with a pump, and storing water supplied from outside and providing the water supplied from outside to the ice making part or draining the water to outside of the water reservoir; and a controller. The controller, when a full state of the ice reservoir is sensed after an ice separation process of separating the ice produced in the ice making part is completed, stops operation of the ice making part and controls a first drainage of the water stored in the water reservoir to a predetermined water level and controls a second drainage of the stored water for a predetermined additional drainage time. In particular, the controller controls the additional drainage time for the second drainage by comparing an actual drainage time for the first drainage with a preset normal time.

The system may further include a water/ice separation part separating the water and the ice that fall down from the ice making part from each other.

The water/ice separation part may be provided with a hole, and the hole may be formed to be smaller in size than the ice produced in the ice making part, whereby the water falling down from the ice making part passes through the hole and thus is stored in the water reservoir while the ice does not pass through the hole and thus is separated from the water.

The water reservoir may be provided with a water level sensor measuring a level of the water stored in the water reservoir.

When the actual drainage time desired for the first drainage is similar to the preset normal time, the controller may allow the second drainage of the water stored in the water reservoir for the predetermined additional drainage time.

When the actual drainage time desired for the first drainage is shorter than the preset normal time, the controller may allow the second drainage of the water stored in the water reservoir for a shorter time than the predetermined additional drainage time.

When the actual drainage time desired for the first drainage is shorter than the preset normal time, the controller may determine that the water level sensor is failed.

When the actual drainage time desired for the first drainage is greater than the preset normal time, the controller may determine that the pump is failed.

The system may further include an alarm part notifying whether a water level sensor or the pump is failed.

The controller may allow the ice making part to perform the ice separation process upon completion of an ice making process, allow the water to be supplied to the water reservoir during an ice separation time during which the ice making part performs the ice separation process, and allow the water stored in the water reservoir to be drained when an accumulated number of ice making cycles of the ice making part reaches a predetermined number of ice making cycles, wherein when the accumulated number of ice making cycles of the ice making part reaches the predetermined number of ice making cycles and the water stored in the water reservoir is drained, the controller may increase the ice separation time, allow the water stored in the water reservoir to be drained for the increased ice separation time, and allow the water to be re-supplied to the water reservoir after the water stored in the water reservoir is drained.

When the water stored in the water reservoir reaches the predetermined water level, the controller may determine that the ice making part has completed the ice making process and allows the ice making part to perform the ice separation process.

The ice separation time may be obtained by adding a predetermined time desired for heating the ice making part to reach a predetermined temperature when the controller determines that the ice making part has completed the ice making process, and a predetermined time during which the ice making part stands by after reaching the predetermined temperature.

When the accumulated number of ice making cycles of the ice making part reaches the predetermined number of ice making cycles and the water stored in the water reservoir is drained, the controller may increase the time during which the ice making part stands by after reaching the predetermined temperature considering a drainage time during which the water is drained, thereby increasing the ice separation time.

When an accumulated number of ice making cycles of the ice making part reaches a predetermined number of ice making cycles, the controller may allow the water stored in the water reservoir to be drained, and the controller may control a drainage time during which the water is drained on the basis of the predetermined number of ice making cycles, thereby allowing the water stored in the water reservoir to be drained.

When the water stored in the water reservoir is drained when the accumulated number of ice making cycles of the ice making part reaches the predetermined number of ice making cycles, the controller may increase the drainage time during which the water is drained when the predetermined number of ice making cycles is decreased, and decrease the drainage time during which the water is drained when the predetermined number of ice making cycles is increased.

According to another aspect of the present disclosure, a method of controlling an ice maker may include the steps of: determining, by the controller, whether the ice separation process of separating the ice produced in the ice making part is completed; determining, by the controller, whether the ice reservoir is in the full state after the ice separation process is completed; allowing, by the controller, the operation of the ice making part to be stopped and a first drainage of the water stored in the water reservoir to a predetermined water level when the full state is sensed; and after the first drainage of the water, controlling, by the controller, the additional drainage time desired for the second drainage by comparing the actual drainage time desired for the first drainage with the preset normal time, and a second drainage of the water stored in the water reservoir during the controlled additional drainage time.

According to a further aspect of the present disclosure, the method may further include the steps of: performing, by the ice making part, the ice separation process when the ice making part completes the ice making process; allowing, by the controller, the water to be supplied to the water reservoir during the ice separation time during which the ice making part performs the ice separation process; allowing the water stored in the water reservoir to be drained when the accumulated number of ice making cycles of the ice making part reaches the predetermined number of ice making cycles; and when the accumulated number of ice making cycles of the ice making part reaches the predetermined number of ice making cycles and the water stored in the water reservoir is drained, increasing, by the controller, the ice separation time, allowing the water stored in the water reservoir to be drained during the increased ice separation time, and allowing the water to be re-supplied to the water reservoir after the water stored in the water reservoir is drained.

According to yet another aspect of the present disclosure, the method may further include: allowing, by the controller, the water stored in the water reservoir to be drained when the accumulated number of ice making cycles of the ice making part reaches the predetermined number of ice making cycles; and controlling, by the controller, the drainage time during which the water is drained on the basis of the predetermined number of ice making cycles, thereby allowing the water stored in the water reservoir to be drained.

As described above, in the present disclosure, when the full state of the ice reservoir is sensed after the ice separation process of separating ice produced in the ice making part is completed, the operation of the ice making part is stopped, water stored in the water reservoir is drained firstly to the predetermined water level and drained secondarily for the predetermined additional drainage time, wherein the actual drainage time desired for the first drainage is compared with the preset normal time and the additional drainage time desired for the second drainage is controlled, whereby water stored in the water reservoir can be efficiently drained. Thus, contamination of water stored in the water reservoir can be inhibited or prevented and thus ice can be produced in a sanitary manner.

Additionally, when the accumulated number of ice making cycles of the ice making part has reached the predetermined number of ice making cycles and thus water stored in the water reservoir is drained, the controller increases the time during which the ice making part stands by after reaching the predetermined temperature considering the drainage time during which water is drained, thereby increasing the ice separation time. Then, the controller allows water stored in the water reservoir to be drained for the increased separation time and allows water to be re-supplied to the water reservoir after water stored in the water reservoir is drained. Thus, the size of ice to be produced after drainage occurs can be maintained similar to the size of ice produced before drainage occurs.

Moreover, when the accumulated number of ice making cycles of the ice making part reaches the predetermined number of ice making cycles and water stored in the water reservoir is drained, the drainage time during which water is drained is controlled based on the predetermined number of ice making cycles whereby water stored in the water reservoir is drained. Thus, water stored in the water reservoir can be more efficiently drained depending on the use area and the usage environment of the ice maker and thus can be maintained more clean and sanitary.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the term "a controller" should be understood as a controller for an ice maker which may be embodied in a hardware manner (e.g., a processor), a software manner, or combination of the hardware and the software manner (i.e., a series of commands), which process at least one function or operation.

Figure 1:
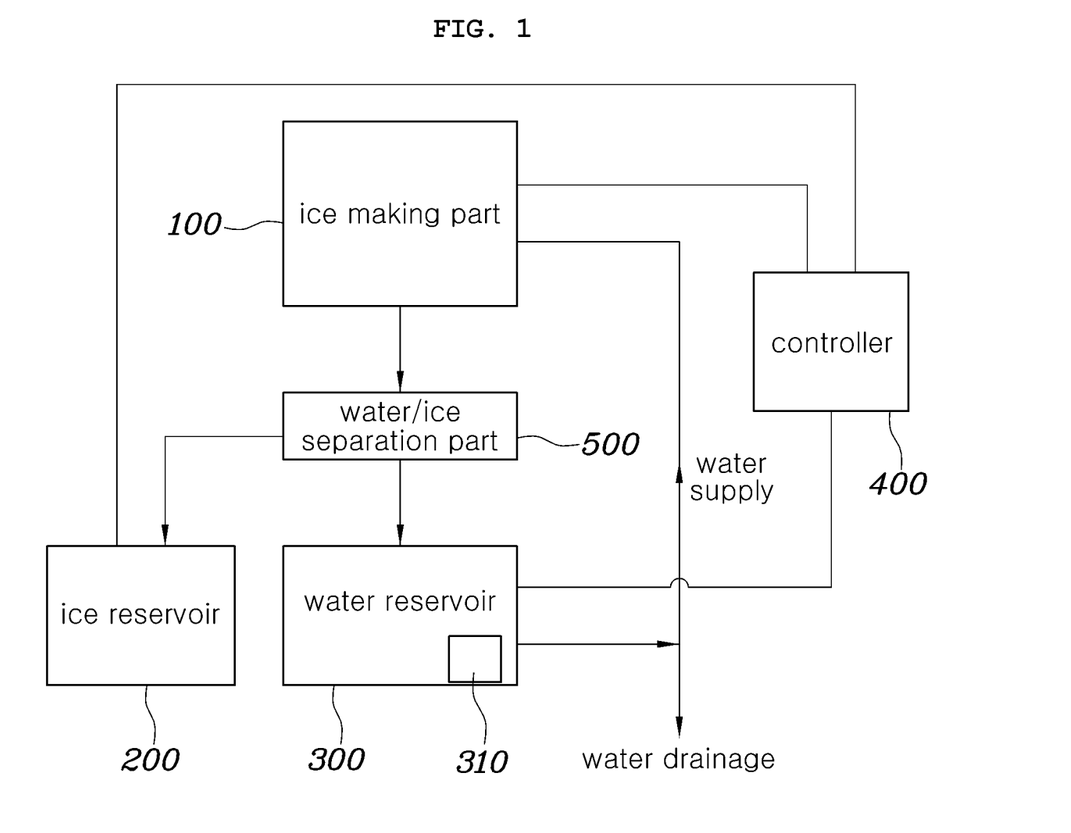
FIG. 1 is a view schematically showing an overall configuration of a system of controlling an ice maker in one form of the present disclosure.
Figure 2:
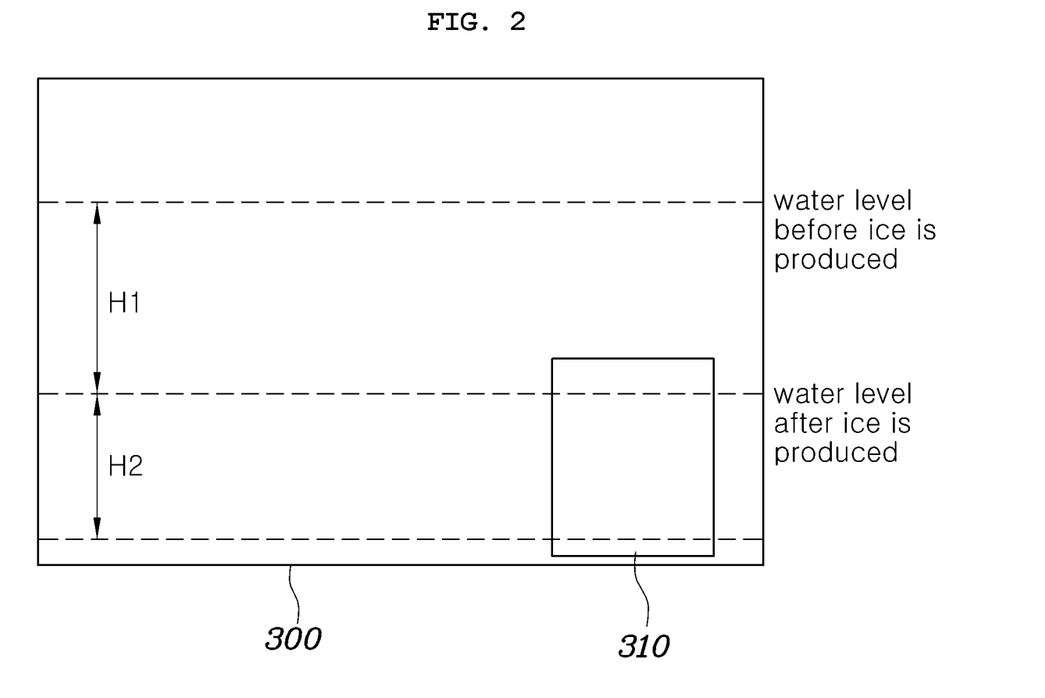
FIG. 2 is a view showing water levels of a water reservoir before and after ice making in an ice making part of the system of controlling the ice maker in one foam of the present disclosure.

FIG. 1 is a view schematically showing an overall configuration of a system of controlling an ice maker in one form of the present disclosure; and FIG. 2 is a view showing water levels of a water reservoir before and after ice making in an ice making part of the system of controlling the ice maker according to one aspect of the present disclosure.

As shown in FIG. 1, a system of controlling an ice maker includes: an ice making part 100 for producing ice; an ice reservoir 200 for storing the ice produced in the ice making part 100 and transferred to the ice reservoir 200; a water reservoir 300 for storing water supplied from the outside and providing the water to the ice making part 100 or draining the water to the outside; and a controller 400, when a full state of the ice reservoir 200 is sensed after an ice separation process of separating the produced ice in the ice making part 100 is completed, allowing operation of the ice making part 100 to be stopped and allowing the water stored in the water reservoir 300 to be firstly drained to a predetermined water level and to be secondarily drained for a predetermined additional drainage time, the controller 400 controlling the additional drainage time desired for the second drainage by comparing an actual drainage time desired for the first drainage with a preset normal time. In one form, the system may be configured by further including an ice/water separating part 500 for separating ice and water falling from the ice making part 100.

The ice making part 100 may be configured such that water stored in the water reservoir 300 is pulled up by using a pump (not shown) and then flows down to a ice making plate (not shown) positioned around an evaporator (not shown), thereby producing ice. Referring to FIG. 2, the water level before ice is produced corresponds to the sum of the levels (i.e., H1+H2), and the ice making part 100 may produce ice from the amount of water corresponding to the water level of H1. In other words, when ice is produced in the ice making part 100, as much water as a water level of H1 may be supplied to the ice making part 100 through the pump 310 to produce ice in the ice making part 100. Accordingly, the water level of the water reservoir 300 after ice is produced in the ice making part 100 may be lowered to level "H2" as shown in FIG. 2. In FIG. 2, H1 may represent the difference between water levels before and after ice is produced in the ice making part 100, and H2 may represent the difference between the water level after ice is produced in the ice making part 100 and a point in proximity to the bottom of the water reservoir 300.

In addition, a mechanical part (not shown) may be located on a side of the ice making part 100, and may include various elements such as a compressor (not shown) for compressing a refrigerant, a heat dissipating plate (not shown) for dissipating heat of the refrigerant, etc. The ice making part 100 may be operated such that the refrigerant is supplied to the evaporator provided on the ice making plate and removes heat from water flowing on the ice making plate, whereby ice is produced. Moreover, the ice making plate of the ice making part 100 may be further provided with a hot wire (not shown) so that after water is cooled in the evaporator and forms ice, the ice is separated from the ice making plate by using the hot wire.

In the ice making part 100, ice making and ice separation processes are repeated, so that ice and water produced in the ice making part 100 may fall downward. As shown in FIG. 1, a water/ice separation part 500 separating ice and water may be provided below the ice making part 100. More specifically, the water/ice separation part 500 may be provided with a hole, and the hole is formed to be smaller in size than ice produced in the ice making part 100, whereby water falling down from the ice making part 100 passes through the hole and thus is stored in the water reservoir 300 while ice does not pass through the hole and thus is separated from the water. In other words, the water/ice separation part 500 may be formed as a mesh having a gap smaller in size than ice to be produced.

The ice reservoir 200 is connected with the water/ice separation part 500 through a connection passage, and ice produced in the ice making part 100 is separated by the water/ice separation part 500 and transferred through the connection passage for storage. Specifically, as shown in FIG. 1, the ice reservoir 200 may be located on the side of the water reservoir 300 and may be provided on the side lower portion of the water/ice separation part 500. More specifically, the water/ice separation part 500 may be configured such that an upper surface is inclined in a direction toward the ice reservoir 200. Thus, ice separated from water by the water/ice separation part 500 slides along the upper surface of the water/ice separation part 500 due to gravity and is moved to the ice reservoir 200 through the connection passage.

Meanwhile, the ice reservoir 200 may be provided on an inside surface thereof with a sensor or a switch for detecting whether the ice reservoir 200 is full of ice. Such a sensor or switch may be provided on an upper inside surface of the ice reservoir 200, and when ice is piled in the ice reservoir 200 up to a predetermined position, and the sensor may sense the ice or the switch is pressed such that a full state of the ice may be sensed.

The water reservoir 300 may be provided with a pump 310, and may store water supplied from the outside and allow the stored water to be supplied to the ice making part 100 or to be drained to the outside using the pump 310. In addition, the water reservoir 300 may be provided with a water level sensor (not shown) for measuring the level of water stored in the water reservoir 300.

When a full state of the ice reservoir 200 is sensed after the ice separation process of separating ice produced in the ice making part 100 is completed, the controller 400 may allow operation of the ice making part 100 to be stopped and then allow water stored in the water reservoir 300 to be firstly drained to the predetermined water level and to be secondarily drained for the predetermined additional drainage time. The controller 400 may control the additional drainage time desired for the second drainage by comparing the actual drainage time desired for the first drainage with the preset normal time, whereby water stored in the water reservoir 300 is efficiently drained. Thus, contamination of water stored in the water reservoir 300 can be inhibited and thus ice is produced in a sanitary manner.

Specifically, when the actual drainage time desired for the first drainage is similar to the preset normal time, the controller 400 may allow water stored in the water reservoir 300 to be drained secondarily for the predetermined additional drainage time. Hereinafter, for convenience of explanation, it is assumed that under a condition where the entire configuration of the ice maker including the pump 310 is normal, the normal time for firstly draining water from the water reservoir 300 to the predetermined water level is 20 seconds, and the additional drainage time for secondarily draining water is 10 seconds.

In this case, when the actual drainage time to drain water to the predetermined water level is from 18 to 22 seconds, which is similar to the preset normal time (20 seconds), the controller 400 may allow water stored in the water reservoir 300 to be secondarily drained for 10 seconds, which is the predetermined additional drainage time. Herein, when the normal time desired for the first drainage is compared with the actual drainage time, and the actual drainage time is within an error range of the preset normal time, the controller 400 may determine that the actual drainage time is similar to the preset normal time. Herein, the error range is not specified and may be set differently depending on the use environment.

In addition, when the actual drainage time desired for the first drainage is shorter than the preset normal time, the controller 400 may allow water stored in the water reservoir 300 to be secondarily drained for a shorter time than the predetermined additional drainage time. More specifically, when the actual drainage time desired for the first drainage is 10 seconds, which is shorter than the preset normal time (20 seconds), the controller 400 may allow water stored in the water reservoir 300 to be secondarily drained for a shorter time than the predetermined additional drainage time of 10 seconds. In other words, in this case, the secondary drainage may be performed for only six seconds, which is shorter than 10 seconds.

Herein, when the actual drainage time desired for the first drainage is shorter than the preset normal time outside the error range thereof, it may mean that drainage is performed faster than a normal state. In this case, when the second drainage is performed for the predetermined additional drainage time, all water stored in the water reservoir 300 may be drained and thus the entire pump 310 may be exposed above the surface of water, leading to damages to the pump 310. In order to prevent such a problem, the controller 400 compares the actual drainage time desired for the first drainage with the preset normal time to control the additional drainage time desired for the second drainage.

Meanwhile, in one form, when the actual drainage time desired to drain water to the predetermined water level is shorter than the preset normal time, the controller 400 may determine that the water level sensor installed in the water reservoir 300 has failed.

In addition, when the actual drainage time desired for the first drainage is greater than the preset normal time, the controller 400 may determine that the pump 310 has failed. More specifically, when the actual drainage time desired for the first drainage is 30 seconds, which is greater than the preset normal time (20 seconds), the controller 400 may determine that the pump 310 has failed. In other words, when the actual drainage time desired for the first drainage is greater than the predetermined normal time outside the error range thereof, it may mean that the pump 310 for draining water in the water reservoir 300 does not operate normally. In this case, the controller 400 may determine that the pump 310 has failed.

Meanwhile, the system of controlling the ice maker in one form of present disclosure may further include an alarm part (not shown) for notifying whether the water level sensor or the pump 310 installed in the water reservoir 300 has failed. When the water reservoir is determined as being failed, the controller part 400 may allow the alarm part to notify whether the water level sensor or the pump 310 has failed. According to one form, the alarm part may be implemented as a display, a speaker, etc.

Further, in one form, the controller 400 may allow the ice making part 100 to perform the ice separation process upon completion of the ice making process, and allow water to be supplied to the water reservoir 300 during an ice separation time during which the ice making part 100 performs the ice separation process. Herein, the ice separation time may be obtained by adding a predetermined time desired for heating the ice making part 100 to reach a predetermined temperature when the controller determines that the ice making part has completed the ice making process, and a predetermined time during which the ice making part 100 stands by after reaching the predetermined temperature. In other words, for example, when the predetermined time desired for heating the ice making part 100 to reach the predetermined temperature is 10 seconds, and the predetermined time during which the ice making part 100 stands by after reaching the predetermined temperature is 10 seconds, the ice separation time may be 20 seconds in total. In this case, the controller 400 may allow water to be supplied to the water reservoir 300 for 20 seconds.

Meanwhile, when water stored in the water reservoir 300 reaches the predetermined water level, the controller 400 may determine that the ice making part 100 has completed the ice making process and allow the ice making part 100 to perform the ice separation process. More specifically, when water stored in the water reservoir 300 reaches the predetermined water level, the controller 400 may allow the ice making part 100 to be heated for the predetermined time and to reach the predetermined temperature, and allow the ice making part 100 to stand by for the predetermined time after the ice making part 100 reaches the predetermined temperature, whereby the ice separation process is performed.

Moreover, when an accumulated number of ice making processes of the ice making part 100 reaches a predetermined number of ice making processes, the controller 400 may allow water stored in the water reservoir 300 to be drained. Referring to FIG. 2, the water level of the water reservoir 300 may be lowered by H1 after the ice making process is completed, and the water level may be increased by H1 during the ice separation time by the controller 400. In this case, water after the ice making remains in the water reservoir 300 and thus the remaining water may be contaminated. In order to solve such a problem, in the present disclosure, when the accumulated number of ice making processes of the ice making part 100 reaches the predetermined number of ice making processes, the controller 400 may allow water stored in the water reservoir 300 to be drained. In other words, for example, in the case that water stored in the water reservoir 300 is set to be drained when the accumulated number of ice making processes is ten, the controller 400 may allow water stored in the water reservoir 300 to be drained when the ice making part 100 performs the ice making processes ten times.

Further, when the accumulated number of ice making cycles of the ice making part 100 reaches the predetermined number of ice making cycles, water stored in the water reservoir 300 is drained. And the controller 400 increases the ice separation time, such that water stored in the water reservoir 300 is drained during the increased ice separation time, and then water is re-supplied to the water reservoir 300 after water stored in the water reservoir 300 is drained. As described above, the controller 400 allows the ice making part 100 to perform the ice separation process when the ice making part 100 completes the ice making process, and allows water to be supplied to the water reservoir 300 during the ice separation time during which the ice making part 100 performs the ice separation process. However, unlike when water is supplied to the water reservoir 300 during the ice separation time during which water is not drained from the water reservoir 300, we have discovered that when water is drained from the water reservoir 300 after the accumulated number of ice making cycles of the ice making part 100 reaches the predetermined number of ice making cycles, the time desired to supply water to the water reservoir 300 is relatively reduced because water stored in the water reservoir 200 has to be drained during a portion of the ice separation time, which may cause a problem that the size of ice to be produced after water is drained is reduced.

In order to solve such a problem, the controller 400 in one form of the present disclosure may be configured such that when the accumulated number of ice making cycles of the ice making part 100 reaches the predetermined number of ice making cycles, water stored in the water reservoir 300 is drained, and the time during which the ice making part 100 stands by after reaching the predetermined temperature is increased considering the drainage time during which water is drained, whereby the ice separation time is increased. Thereafter, during the increased ice separation time, water stored in the water reservoir 300 is drained, and then water is re-supplied to the water reservoir 300 after water stored in the water reservoir 300 is drained.

For example, it is assumed that the predetermined time during which the ice making part 100 is heated to reach the predetermined temperature is 10 seconds, the predetermined time during which the ice making part 100 stands by after reaching the predetermined temperature is 10 seconds, and thus the ice separation time is 20 seconds in total and the time during which water stored in the water reservoir 300 is drained is 20 seconds. In this case, when the accumulated number of ice making cycles of the ice making part 100 has reached the predetermined number of ice making cycles and thus water stored in the water reservoir 300 is drained, the controller 400 may be configured such that the time during which the ice making part 100 stands by after reaching the predetermined temperature is increased to 30 seconds, whereby the ice separation time is increased to 40 seconds, water is drained for 20 seconds out of the increased 40 seconds, and water is re-supplied for 20 seconds. Thus, the size of ice to be produced after drainage occurs can be maintained similar to the size of ice produced before drainage occurs.

Meanwhile, when the accumulated number of ice making cycles of the ice making part 100 reaches the predetermined number of ice making cycles, the controller 400 allows water stored in the water reservoir 300 to be drained. Herein, the controller 400 may control the drainage time during which water is drained on the basis of the predetermined number of ice making cycles, thereby allowing water stored in the water reservoir 300 to be drained.

More specifically, the controller 400 may increase the drainage time during which water is drained when the predetermined number of ice making cycles is decreased and may decrease the drainage time during which water is drained when the predetermined number of ice making cycles is increased. For example, when the predetermined number of ice making cycles is 10 and the drainage time during which water is drained is 10 seconds, the controller 400 may increase the drainage time during which water is drained to 20 seconds when the predetermined number of ice making cycles is five. Herein, the fact that the predetermined number of ice making cycles is small may mean that a cycle of water drainage is short, and the fact that the cycle of water drainage is short may mean that the water quality is poor. As such, when water having poor water quality is used, sediments may accumulate at the bottom of the water reservoir 300. In one form of the present disclosure, when water quality is poor and thus the predetermined number of ice making cycles is decreased, the drainage time during which water is drained is increased by the controller 400. Thus, water stored in the water reservoir 300 can be more efficiently drained, thereby allowing water stored in the water reservoir 300 to be maintained clean and sanitary.

According to another form, in order to drain water stored in the water reservoir 300 when the accumulated number of ice-making cycles of the ice making part 100 reaches the predetermined number of ice-making cycles, the present disclosure may further include a setting part (not shown) for setting the number of ice-making cycles. In other words, depending on the use area and the usage environment of the ice maker, the setting part may change the cycle of water drainage in which water stored in the water reservoir 300 is drained.

Figure 3:
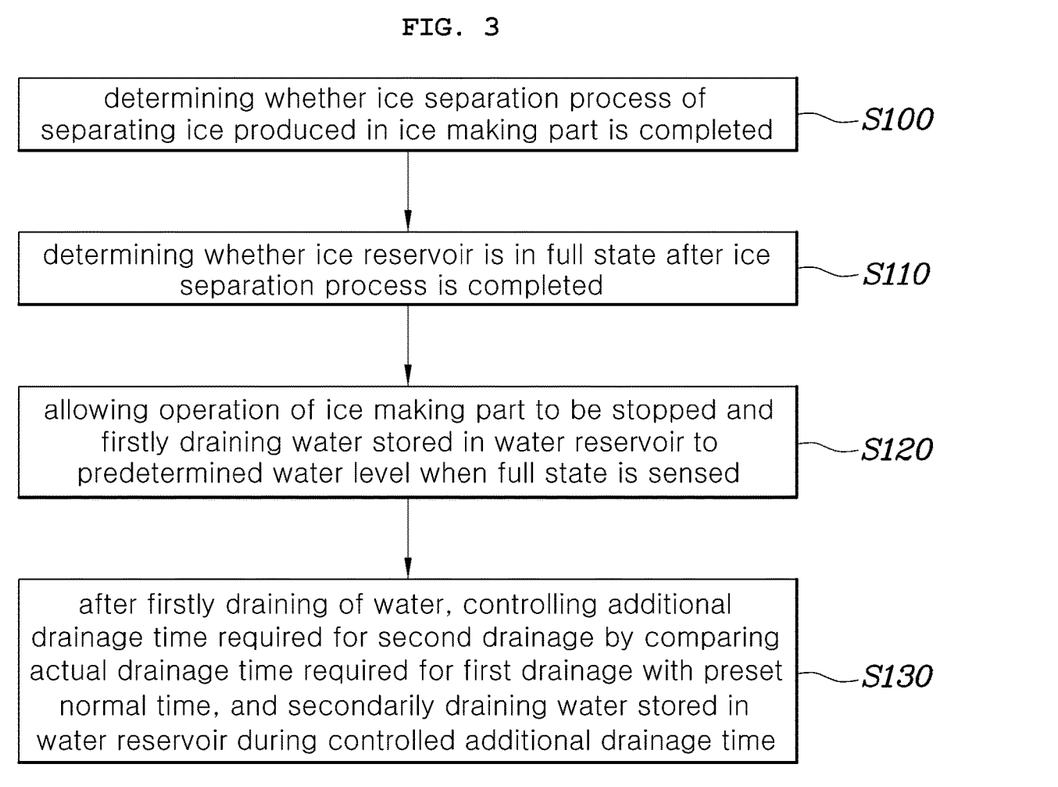
FIG. 3 is a flowchart showing a flow of a method of controlling an ice maker in a first form of the present disclosure.

FIG. 3 is a flowchart showing a flow of a method of controlling an ice maker in one form of the present disclosure. As shown in FIG. 3, the method of controlling the ice maker includes the steps of: determining whether an ice separation process of separating ice produced in the ice making part is completed; determining whether an ice reservoir is in a full state after the ice separation process is completed; allowing operation of the ice making part to be stopped and firstly draining water stored in a water reservoir to a predetermined water level when the full state is sensed; and after the firstly draining of the water, secondarily draining the water stored in the water reservoir for a predetermined additional drainage time.

Figure 4:
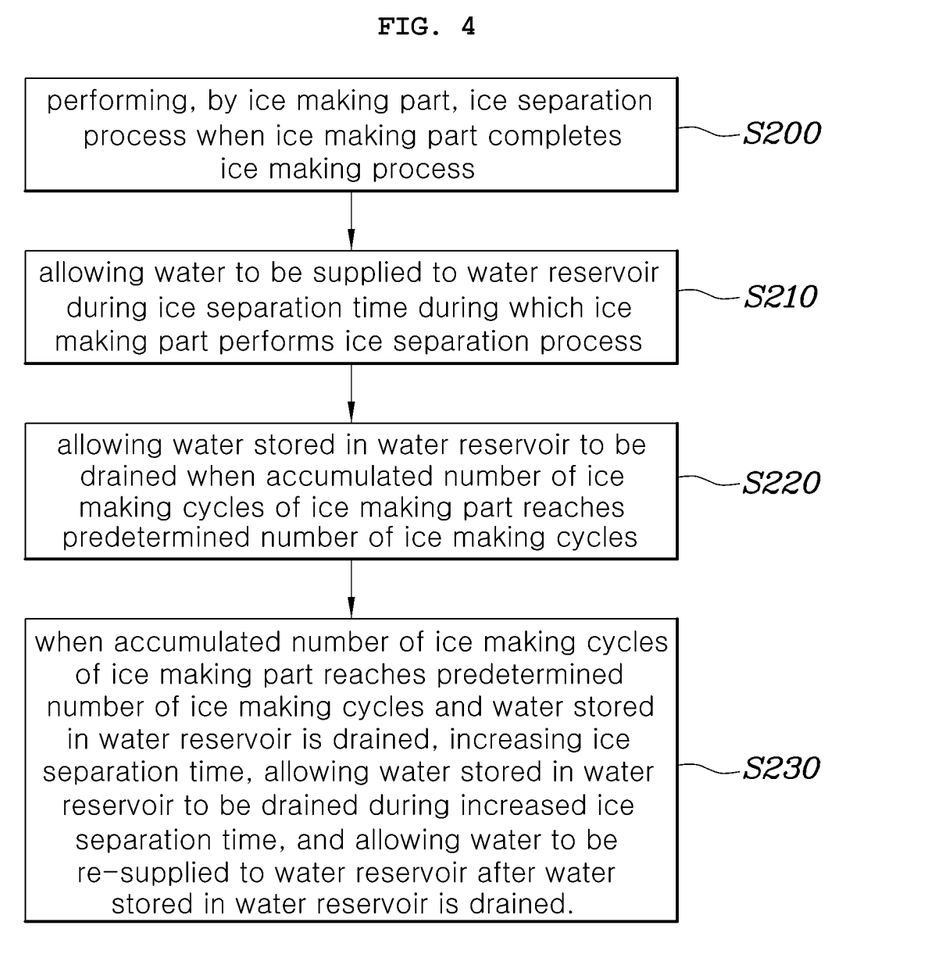
FIG. 4 is a flowchart showing a flow of a method of controlling an ice maker in a second form of the present disclosure.

FIG. 4 is a flowchart showing a flow of a method of controlling an ice maker in a second form of the present disclosure. As shown in FIG. 4, the method of controlling the ice maker includes the steps of: performing, by an ice making part, an ice separation process when the ice making part completes an ice making process; allowing water to be supplied to a water reservoir during an ice separation time during which the ice making part performs the ice separation; allowing the water stored in the water reservoir to be drained when an accumulated number of ice making cycles of the ice making part reaches a predetermined number of ice making cycles; and when the accumulated number of ice making cycles of the ice making part reaches the predetermined number of ice making cycles and the water stored in the water reservoir is drained, increasing the ice separation time, allowing the water stored in the water reservoir to be drained during the increased ice separation time, and allowing the water to be re-supplied to the water reservoir after the water stored in the water reservoir is drained.

Figure 5:
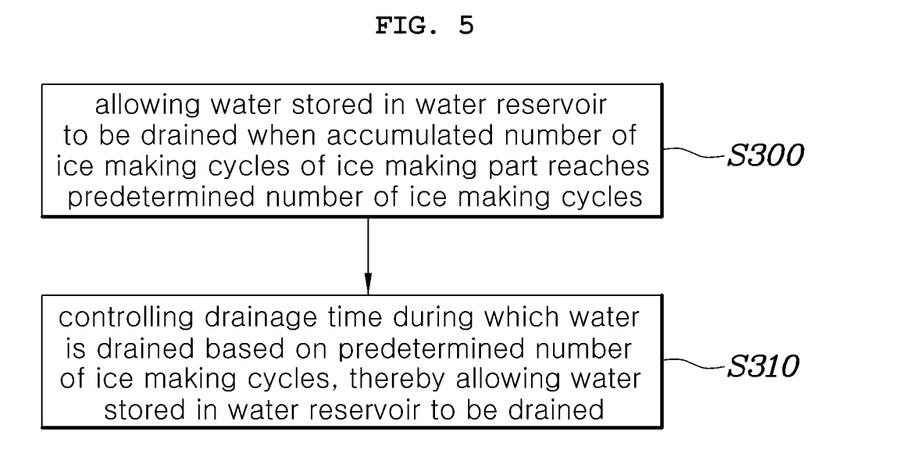
FIG. 5 is a flowchart showing a flow of a method of controlling an ice maker in a third form of the present disclosure.

FIG. 5 is a flowchart illustrating a method of controlling an ice maker in a third form of the present disclosure. As shown in FIG. 5, the method of controlling the ice maker includes the steps of: allowing water stored in a water reservoir to be drained when an accumulated number of ice making cycles of an ice making part reaches a predetermined number of ice making cycles; and controlling a drainage time during which the water is drained on the basis of the predetermined number of ice making cycles such that the water stored in the water reservoir is drained.

As described above, when the full state of the ice reservoir is sensed after the ice separation process of separating ice produced in the ice making part is completed, the operation of the ice making part is stopped, water stored in the water reservoir is drained firstly to the predetermined water level and drained secondarily for the predetermined additional drainage time. In particular, the actual drainage time desired for the first drainage is compared with the preset normal time, and the additional drainage time desired for the second drainage is controlled, whereby water stored in the water reservoir can be efficiently drained. Thus, contamination of water stored in the water reservoir can be inhibited or prevented and thus ice can be produced in a sanitary manner.

In addition, when the accumulated number of ice making cycles of the ice making part has reached the predetermined number of ice making cycles and thus water stored in the water reservoir is drained, the controller increases the time during which the ice making part stands by after reaching the predetermined temperature considering the drainage time during which water is drained, thereby increasing the ice separation time. Then, the controller allows water stored in the water reservoir to be drained for the increased separation time and allows water to be re-supplied to the water reservoir after water stored in the water reservoir 300 is drained. Thus, the size of ice to be produced after drainage occurs can be maintained similar to the size of ice produced before drainage occurs.

Moreover, when the accumulated number of ice making cycles of the ice making part reaches the predetermined number of ice making cycles and water stored in the water reservoir is drained, the drainage time during which water is drained is controlled based on the predetermined number of ice making cycles whereby water stored in the water reservoir is drained. Thus, water stored in the water reservoir can be more efficiently drained depending on the use area and the usage environment of the ice maker and thus can be maintained more clean and sanitary.

Although exemplary forms of the present disclosure has been described for illustrative purposes, those skilled in the art will appreciate that various modifications, additions and substitutions are possible, without departing from the scope and spirit of the present disclosure.

What is claimed is:

1. A system of controlling an ice maker, the system comprising:
an ice making part configured to produce ice;
an ice reservoir configured to store the produced ice;
a water reservoir provided with a pump, and configured to store water and supply the water to the ice making part or drain the water outside of the water reservoir; and
a controller, wherein, when a full state of the ice reservoir is sensed after an ice separation process of separating the produced ice in the ice making part is completed, the controller is configured to stop operation of the ice making part and control a first drainage of the stored water in the water reservoir to a predetermined water level and control a second drainage of the stored water for a predetermined additional drainage time,
wherein the controller is configured to control the additional drainage time for the second drainage by comparing an actual drainage time for the first drainage with a preset normal time.

2. The system of claim 1, further comprising:
a water/ice separation part configured to separate the water and the produced ice.

3. The system of claim 2, wherein the water/ice separation part is provided with a hole configured to be smaller in size than the produced ice, and wherein the water falling from the ice making part passes through the hole and is stored in the water reservoir while the produced ice does not pass through the hole and thus is separated from the water.

4. The system of claim 1, wherein the water reservoir is provided with a water level sensor configured to measure a level of the water stored in the water reservoir.

5. The system of claim 1, wherein, when the actual drainage time for the first drainage is equal to the preset normal time, the controller allows the second drainage of water stored in the water reservoir for the predetermined additional drainage time.

6. The system of claim 1, wherein when the actual drainage time for the first drainage is shorter than the preset normal time, the controller allows the second drainage of water stored in the water reservoir for a shorter time than the predetermined additional drainage time.

7. The system of claim 4, wherein when the actual drainage time for the first drainage is shorter than the preset normal time, the controller determines that the water level sensor is failed.

8. The system of claim 2, wherein when the actual drainage time for the first drainage is greater than the preset normal time, the controller determines that the pump is failed.

9. The system of claim 1, further comprising:
an alarm part configured to notify whether a water level sensor configured to measure a level of the water or the pump is failed.

10. The system of claim 1, wherein the controller is configured to:
control the ice making part to perform the ice separation process upon completion of the ice making process,
allow the water to be supplied to the water reservoir during an ice separation time during which the ice making part performs the ice separation process, and
allow the water stored in the water reservoir to be drained when an accumulated number of ice making cycles of the ice making part reaches a predetermined number of ice making cycles,
wherein when the accumulated number of ice making cycles of the ice making part reaches the predetermined number of ice making cycles and the water stored in the water reservoir is drained, the controller is configured to:
increase the ice separation time, allow the water stored in the water reservoir to be drained for the increased ice separation time, and allow the water to be re-supplied to the water reservoir after the water stored in the water reservoir is drained.

11. The system of claim 10, wherein when the water stored in the water reservoir reaches the predetermined water level, the controller is configured to determine that the ice making part has completed the ice making process and allow the ice making part to perform the ice separation process.

12. The system of claim 10, wherein the ice separation time is obtained by adding a first predetermined time to a second predetermined time, wherein the first predetermine time is a period during which the ice making part is heated to reach a predetermined temperature when the controller determines that the ice making part has completed the ice making process, and the second predetermined time is a period during which the ice making part stands by after reaching the predetermined temperature.

13. The system of claim 12, wherein when the accumulated number of ice making cycles of the ice making part reaches the predetermined number of ice making cycles and the water stored in the water reservoir is drained, the controller increases the second predetermined time during which the ice making part stands by after reaching the predetermined temperature based on a drainage time during which the water is drained, thereby increasing the ice separation time.

14. The system of claim 1, wherein when an accumulated number of ice making cycles of the ice making part reaches a predetermined number of ice making cycles, the controller is configured to allow the water stored in the water reservoir to be drained and control a drainage time during which the water is drained on the basis of the predetermined number of ice making cycles, such that the water stored in the water reservoir is drained.

15. The system of claim 14, wherein when the water stored in the water reservoir is drained when the accumulated number of ice making cycles of the ice making part reaches the predetermined number of ice making cycles, the controller is configured to increase the drainage time during which the water is drained when the predetermined number of ice making cycles is decreased, or decrease the drainage time during which the water is drained when the predetermined number of ice making cycles is increased.

16. A method of controlling an ice maker, the method comprising the steps of:

determining, by a controller, whether an ice separation process of separating ice produced in an ice making part is completed;

determining, by the controller, whether an ice reservoir is in a full state after the ice separation process is completed;

allowing, by the controller, operation of the ice making part to be stopped and a first drainage of the water stored in the water reservoir to a predetermined water level when the full state is sensed;

after the first drainage of the water, controlling, by the controller, an additional drainage time for a second drainage by comparing an actual drainage time for the first drainage with a preset normal time, and allowing, by the controller, the second drainage of the water stored in the water reservoir during the controlled additional drainage time.

17. The method of claim 10, the method further comprising:

performing, by the ice making part, the ice separation process when the ice making part completes the ice making process;

allowing, by the controller, water to be supplied to the water reservoir during a ice separation time during which the ice making part performs the ice separation process;

allowing, by the controller, the water stored in the water reservoir to be drained when an accumulated number of ice making cycles of the ice making part reaches a predetermined number of ice making cycles; and increasing, by the controller, the ice separation time when the accumulated number of ice making cycles of the ice making part reaches the predetermined number of ice making cycles and the water stored in the water reservoir is drained, allowing the water stored in the water reservoir to be drained during the increased ice separation time, and allowing the water to be re-supplied to the water reservoir after the water stored in the water reservoir is drained.

18. The method of claim 14, the method further comprising:

allowing, by the controller, the water stored in the water reservoir to be drained when the accumulated number of ice making cycles of the ice making part reaches the predetermined number of ice making cycles; and controlling, by the controller, the drainage time during which the water is drained on the basis of the predetermined number of ice making cycles such that the water stored in the water reservoir is drained.

* * * * *